United States Patent [19]

Zucker

[11] 4,238,304

[45] Dec. 9, 1980

[54] METHOD FOR IMPROVED RECOVERY OF TALL OIL FROM BLACK LIQUORS

[75] Inventor: Jerry Zucker, Charleston, S.C.

[73] Assignee: Raybestos-Manhattan, Inc., Trumbull, Conn.

[21] Appl. No.: 71,007

[22] Filed: Aug. 30, 1979

[51] Int. Cl.³ .................. B01D 17/06; C02F 1/46; C02F 1/48
[52] U.S. Cl. .................. 204/131; 204/149; 204/186
[58] Field of Search .............. 204/186–191, 204/131, 136, 149

[56] References Cited

U.S. PATENT DOCUMENTS

| 942,207 | 12/1909 | Kitsee | 204/131 |
| 1,062,016 | 5/1913 | Langlet | 204/131 |
| 2,905,604 | 9/1959 | Kennedy | 204/131 |
| 4,098,673 | 7/1978 | Zucker | 204/186 |

Primary Examiner—T. M. Tufariello
Attorney, Agent, or Firm—Gary, Juettner & Pyle

[57] ABSTRACT

Acidulated black liquor soap from a paper making process is subjected to an electrical potential gradient, in order to improve the yield of tall oil recoverable from the sludge portion of acidulated soap upon separation.

8 Claims, 2 Drawing Figures

METHOD FOR IMPROVED RECOVERY OF TALL OIL FROM BLACK LIQUORS

BACKGROUND OF THE INVENTION

In the manufacture of alkaline pulp for the production of paper, wood is delignified with caustic soda, and a profitable operation requires that the soda be eventually recovered for re-use. In the recovery procedure, the process liquor is concentrated and burned to remove organic materials.

In general, alkaline pulp is made by subjecting wood chips to caustic soda together with the application of heat and pressure by injecting steam into a closed system. The non-cellulose constituents of the wood are hydrolyzed and rendered soluble, enabling the cellulose fibers to be separated.

Following the cooking procedure, the liquor is recovered and is constructed by evaporating prior to burning. Until recent times, the residual organic residues in the liquor were ignored and simply burned to reclaim the inorganic soda. One of the by-products in the processing liquor is referred to as tall oil, derived from the Swedish term tallol. Tall oil is a liquor composed mainly of resin acids and fatty acids in varying proportions, according to the character of the wood and the cooking methods employed. More recently, however, tall oil soap has become an important by-product that is recovered from the concentrated liquor by floatation. The tall oil soap is then acidulated and converted to the acid form and allowed to separated. A large amount of tall oil, upon acidulation and separation, remains in a sludge layer, and if not somehow separated, will be lost as waste or only burned for its heat value and not recovered for its much higher tall oil value.

SUMMARY OF THE INVENTION

In accordance with the present invention, black liquor soap is acidulated, and the various phases of the liquid slurry are allowed to settle and separate, with the tall oil separating out at the top. During the separation process a low DC or AC current is applied across the slurry, which as a result of surface charge phenomena, significantly increases the extent and degree of separation of the tall oil from the underlying sludge, thus allowing a greater proportion to be recovered from the acidulated soap.

THE DRAWING

DESCRIPTION OF THE PREFERRED EMBODIMENT

Figure 1:
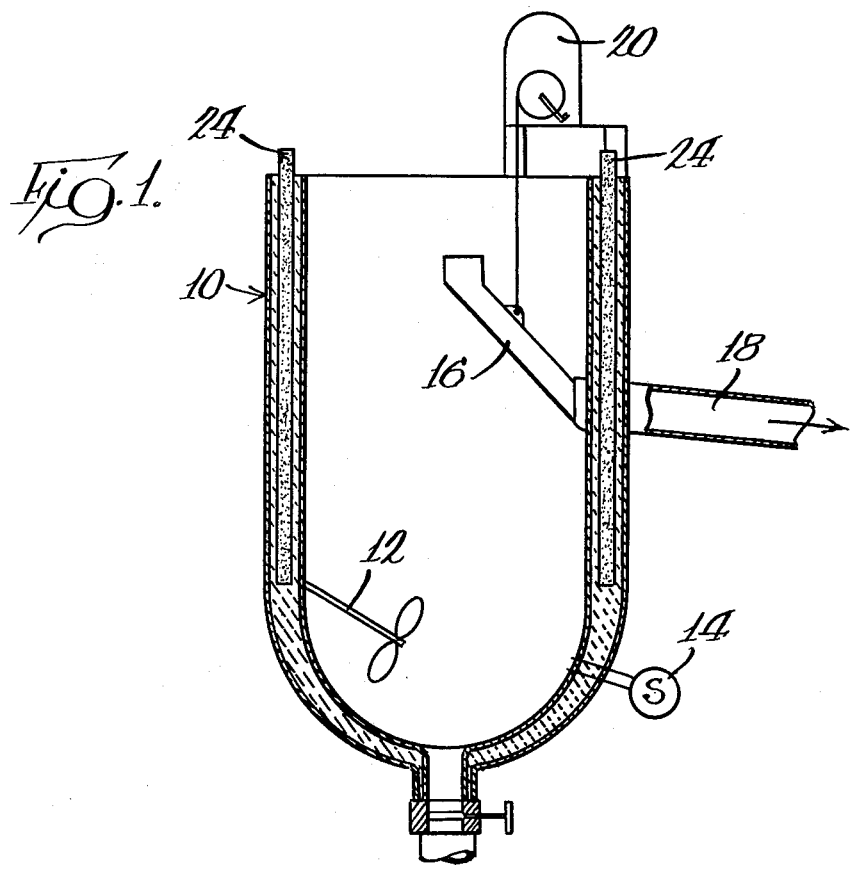
FIG. 1 is a vertical sectional view of a tank that has been modified for practicing the process of the present invention.

The present invention will be described in connection with the recovery of tall oil from black liquor soap resulting from the manufacture of pulp by an alkaline process, such as the soda or kraft processes, although the principles of the present invention are applicable to similar processes wherein tall oil constituents are present in a partially separated liquid mixture.

The methods for making pulp, recovering the liquor and skimming of the black liquor soap are well known to those skilled in the art and need not be repeated herein. The black liquor soap containing other impurities is first acidified until a stable pH of from about 2.0 to about 2.5 is attained. Preferably, the acidulation is attained with the addtion of a mineral acid such as 30% sulfuric acid, and vigorously agitating the liquor while heating to a temperature up to about 210° F. The acidulation may be carried out in a conventional pulp cooking tank or other suitable vessel, and direct or indirect steam heating may be employed.

After a stable adjusted pH within the above range is attained for at least about 20 to about 30 minutes, heat and agitation are discontinued, and the mixture is allowed to stand.

After passage of a period of time, the acidified liquor separates into four different and fairly distinct phases. The uppermost layer will comprise tall oil, the second layer will contain sludge comprised of a mixture of tall oil, solid lignates, miscellaneous liquor solids, and a minor amount of water. The next layer will contain brine, comprising aqueous acid solubles, residual sulfuric acid, and the like. The lower-most layer will be comprised of precipitated calcium sulfate.

Since the typical sludge layer will contain from about 25–40% tall oil, it would be desirable to separate and remove at least a portion of this oil, since otherwise this component would be eventually destroyed when burned in the recovery boilers. Recycling of the sludge back into the soap cooking operation is expensive and eventually detrimental to attainable tall oil yields.

In order to decrease the amount of tall oil entrained in the sludge layer, and to further improve the clarity of the oil recovered, an electrical potential is applied across the sludge layer and preferably across the entire volume or upper three layers of materials just prior to or immediately or shortly after agitation has ceased.

The potential applied, which is relatively low, may be AC or DC, and the potential is applied for a period of time sufficient to attain maximum separation without any excessive electrolysis of the mixture. The time period of application is dependent on the potential applied and number of electrodes used, but typically the time of application will be in the order of from about one to about twenty-five minutes. The degree of voltage gradient in the system is not critical, and even low gradients significantly improve separation. Without way of limitation a voltage gradient in the range of about one to about 100 volts is generally suitable, it being understood that the degree and period of application will be easily established once the variables of the actual system have been determined, such as the conductivity of the solution and placement of electrodes.

Preferably, only the upper one-half of the entire volume of materials is treated, and the voltage is maintained at a low level, i.e., below 15 volts to avoid excessive electrolysis. Thereafter, the voltage application may be terminated and the mixture allowed to stand while separation continues. Intermittent application of the gradient is also possible.

It has been determined that after the liquor has been subjected to an electric potential gradient, the amount of tall oil remaining in the sludge will be significantly reduced, i.e., typically down to a level of less than 15% by weight, with an attendant greater recovery of tall oil in the upper fraction. An improvement in the order of up to about 10% of recoverable tall oil can be expected, based on the total amount of black liquor soap being processed.

If a settling tank or other vessel is used, the tall oil may then be recovered by simply decanting. In some applications, the tall oil is continuously separated using a centrifuge, and it is within the scope of this invention, to provide an electrical potential across the liquid in the centrifuge to further improve separation.

Figure 2:
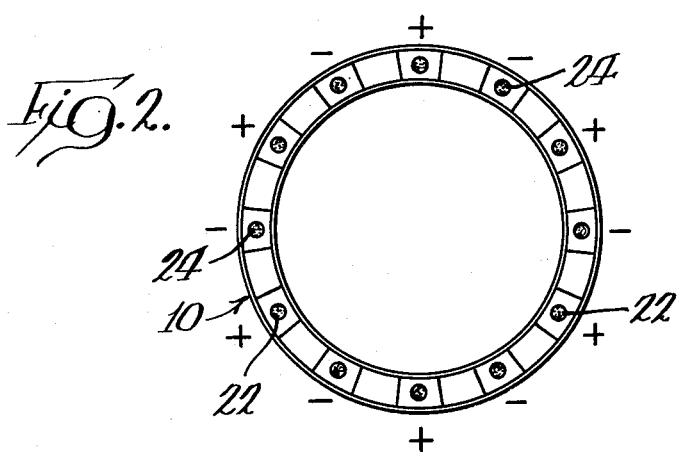
FIG. 2 is a sectional view of the device shown in FIG. 1.

A simplified apparatus for the improved recovery of tall oil is shown in FIGS. 1 and 2. A vessel 10 is provided, which may take the form of a typical cook tank that is lined with a porous, acid-resistant material, such as fire, brick or the like. As shown in FIG. 1, a mixer 12 is disposed in the tank for agitating the contents, and means for heating are provided, such as the steam injector means indicated schematically at 14. In order to recover the separated fatty acid in the upper layer a siphon or decanting tube 16 is disposed in the tank and is connected to an external outlet 18 leading to a storage reservoir for the recovered tall oil. The downwardly inclined decanting tube 16 is preferably vertically adjustable by any suitable means, such as a winch 20 connected to the tube.

In addition to the foregoing elements, which are essentially conventional, the tank 10 is provided with a means for applying electrical potential across the contents. As shown, spaced electrodes are provided in the tank to provide the potential across the black liquor soap. When DC current is used, positive electrodes 22 and negative electrodes 24 are arranged in an alternating array around the perimeter of the tank. As shown, the electrodes 22 and 24 may be in the form of a graphite rods embedded or otherwise disposed within the porous lining of the vessel.

I claim:

1. A method for improving recovery of tall oil from black liquor obtained from a paper making process, comprising the steps of first separating the alkaline black liquor soap from the black liquor, acidifying the black liquor soap to a stable pH of from about 2.0 to about 2.5 until the soap is substantially converted into the acid form, whereby the acidified soap will separate into layers including an upper tall oil layer and a lower sludge layer containing tall oil, applying an electrical potential to said acidified soap with a voltage gradient in the range of about one to about 100 volts for a time sufficient to cause liberation of tall oil from the sludge layer without substantial hydrolysis, and removing the tall oil from the liquor.

2. The method of claim 1 wherein the electric potential is applied between spaced electrodes in conductive contact with the acidified liquor.

3. The method of claim 1 wherein the electrical potential is applied only to about the upper half of the acidified liquor.

4. The method of claim 2 wherein the electric potential is direct current, and the spaced electrodes are alternating positive and negative electrodes.

5. The method of claim 4 wherein the voltage is less than 15 volts.

6. The method of claim 1 wherein the application of electrical potential is discontinued and the acidified liquor is allowed to stand prior to the removal of the separated tall oil.

7. The method of claim 1 wherein the tall oil is separated from the acidified liquor with a centrifuge.

8. The method of claim 7 wherein said electrical potential is applied across said acidified liquor while passing through said centrifuge.

* * * * *